Aug. 5, 1969   B. C. CRANAGE   3,459,218
AUDIO RELIEF VALVE
Filed March 2, 1967
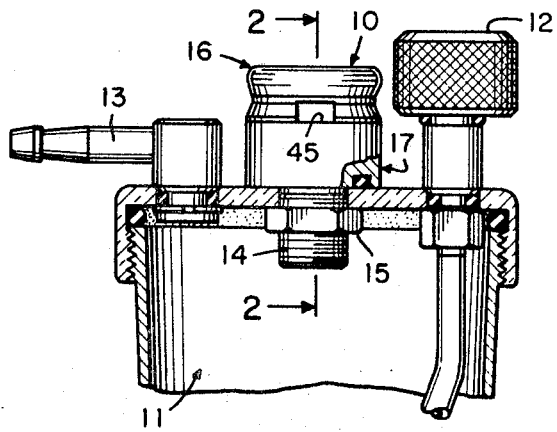
FIG. 1
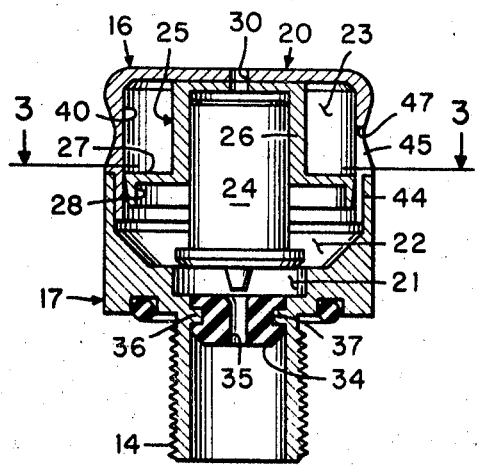
FIG. 2
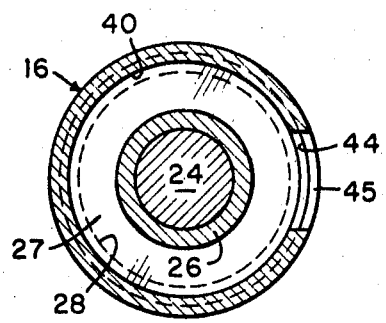
FIG. 3
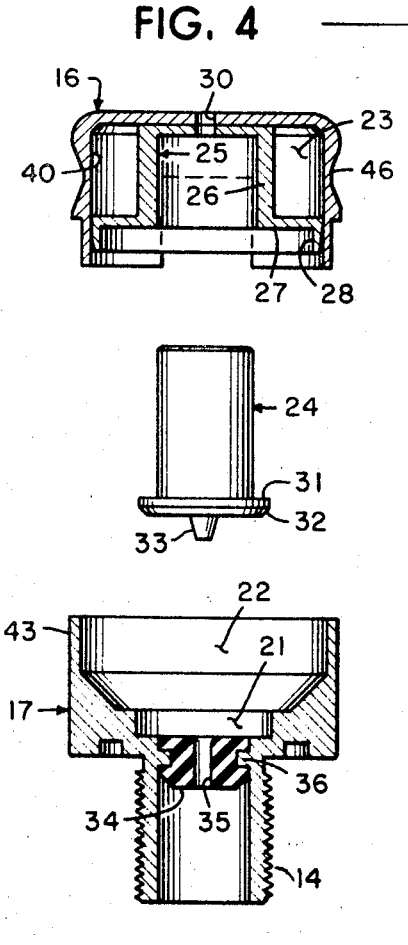
FIG. 4
FIG. 5
INVENTOR
BIDWELL C. CRANAGE
BY
Cohn and Powell
ATTORNEYS United States Patent Office 3,459,218
Patented Aug. 5, 1969

3,459,218
AUDIO RELIEF VALVE
Bidwell C. Cranage, Ferguson, Mo., assignor to Stile-Craft Manufacturers, Inc., St. Louis, Mo., a corporation of Missouri
Filed Mar. 2, 1967, Ser. No. 620,162
Int. Cl. E03b 7/07; F16k 37/00, 17/20
U.S. Cl. 137—557                               7 Claims

ABSTRACT OF THE DISCLOSURE

A relief valve having a hollow body subdivided into an intercommunicating pressure chamber and expansion chamber, and a whistle or resonating chamber. An inlet passage connects the pressure chamber to the pressure vessel, and an outlet passage, forming a whistle, connects the expansion chamber to the atmosphere. A plug acts as a piston within the pressure chamber and a spigot at the end of the plug closes the inlet passage under working pressure. Excessive pressure within the pressure vessel raises the plug and discharges a controlled quantity of gas into the expansion chamber. The resulting pressure decrease returns the plug into the pressure chamber. Gas escaping to atmosphere emits an intermittent, substantially constant pitch whistle.

Background of invention

This invention relates generally to improvements in an audible relief valve, and more particularly to a valve which emits intermittent, substantially constant pitch whistles when subjected to pressure above a predetermined range.

It is likely that from the earliest days of the industrial revolution, when the pressure vessel became widely used as a boiler or a container for pressurized gas, inventors have worked on safety valves activated by pressure change. Almost invariably, safety valves activated by the pressure they release are spring-loaded, and the warning signal quite logically has been that of the whistle. One of the problems inherent in this fundamental form is that continuous pressure increase tends to raise the pitch of the whistle until it becomes inaudible.

Another problem in pressure warning devices, in general, is that they tend, in their more sophisticated form, to become complex and therefore expensive.

A review of the known prior art reveals a number of devices which provide a general warning, one of them accomplish this warning in the manner of the present invention.

U.S. Patent No. 643,117 is an early whistle warning device which is simply a spring-loaded valve which lifts under pressure, thereby exhausting gas into the vicinity of a whistle chamber. There is no provision for a pressure chamber releasing a controlled amount of gas into an expansion chamber.

U.S. Patent No. 2,200,903 discloses a relief valve having a plug interfitting an inlet passage leading to an expansion chamber, but the purpose of this chamber is to enable the gas to expand and dissipate without adversely affecting the relationship of the plug in the inlet passage, that is without creating a back pressure. There is no suggestion of a pressure chamber disclosed in this patent.

U.S. Patent No. 2,288,984 discloses an indicator device which is activated by the raising of a ball seated in an aperture by pressure which would not itself be great enough to raise the ball, thereby allowing the gas to escape and provide a whistle warning. The gas is directed to a diaphragm of relatively large area, and the diaphragm, being in point contact with the ball valve, is subjected to sufficient pressure on its underside to produce a force which raises it when the pressure reaches a predetermined value.

U.S. Patent No. 2,631,607 essentially discloses a spring-loaded piston mounted within a sleeve, the piston and sleeve unit together constituting a compound, spring-loaded piston mounted within a second sleeve. Predetermined pressure raises the first piston, thereby opening inlet ports into a whistle chamber. Continued pressure urges the compound piston upward, thereby opening exhaust ports and providing pressure release. No expansion is provided of a controlled quantity of gas from a pressure chamber, thereby causing the emission of intermittent constant pitch whistles.

None of the above patents, nor any other of those reviewed, discloses a structure whereby gas is released to an expansion chamber more quickly than it can be replaced from a pressure chamber because of the relative input and escape areas provided at each end of the pressure chamber.

Summary of the invention

The body of the relief valve is substantially hollow and is subdivided into three chambers, namely: a pressure chamber, an expansion chamber and a whistle chamber.

The pressure chamber communicates with the expansion chamber but the whistle chamber is partitioned from the expansion chamber.

An inlet passage connects the pressure chamber to the pressure vessel, and an outlet passage connects the expasion chamber with the atmosphere.

The outlet passage terminates in an aperture having a lip and, in cooperation with the whistle chamber, provides the means of producing an audible sound as exhaust gas escapes to atmosphere through the passage.

A plug, having one end acting as a piston head, is slidably received in the pressure chamber, the other end of the plug guided by a sleeve. The plug is provided with a spigot at its piston head end which acts, under normal working pressure, as a closure to the inlet passage.

Excessive pressure urges the spigot and the plug upward in the pressure chamber. The spigot becomes disengaged from the seat defining the inlet passage before the plug reaches the end of the pressure chamber stroke, and when the plug is effectively withdrawn, gas is released from the pressure chamber to the extension chamber more quickly than it can be replaced from the pressure vessel. This follows because of the comparative size of the input and escape areas provided at opposing ends of the pressure chamber. The resulting pressure fall causes the plug to return to the pressure chamber, and the controlled quantity of gas released into the expansion chamber escapes therefrom to atmosphere through the outlet passage.

The body includes a cap and a base, the cap being reduced at one end to allow its insertion into the base. Part of the overlapping rim of the cap is cut away to provide a notch, and an overlying skirt, provided by a flange attached to the guide socket, converts the notch into the outlet passage. This passage leads to a whistle aperture in the side of the body.

The cap includes a peripheral groove which reduces the sidewall thickness at the upper margin of the aperture, thereby forming a whistle lip.

The features referred to in this summary, together with numerous other advantages of the invention, will more clearly appear from the following detailed description of a preferred embodiment, particularly when considered in connection with the accompanying drawing.

Brief description of the drawings

FIG. 1 is an elevational view of the relief valve, partly in section, mounted upon a pressure vessel, the vessel being shown in fragmentary form;

FIG. 2 is an enlarged sectional view on line 2—2 of FIG. 1 illustrating the relationship of parts when the relief valve is in an operating condition;

FIG. 3 is a sectional plan view on line 3—3 of FIG. 2;

FIG. 4 is an exploded view illustrating more clearly the parts of the valve, and FIG. 5 is an elevational view of the valve cap.

Description of the preferred embodiment

Referring now by characters of reference to the drawing, and first to FIG. 1, it will be understood that the invention includes an audio relief valve 10 mounted on a pressure vessel having the form of a humidifier assembly 11, the humidifier assembly 11 being provided with an inlet subassembly 12 and an outlet subassembly 13. The valve 10 is provided with a mounting stub 14 and is securely attached to the humidifier assembly 11 by means of nut 15.

As shown in FIGS. 2 and 3, the valve 10 includes a cap 16 and a base 17 which together constitute a cylindrical body 20. The body is substantially hollow and sub-divided into three chambers, namely: a pressure chamber 21, expansion chamber 22 and a whistle or resonating chamber 23. The pressure chamber 21 communicates with the expansion chamber 22, and slidably receives a plug 24, the plug 24 acting as a piston and the pressure chamber 21 acting as a cylinder.

The upper end of the plug 24 is slidably received in a sleeve 26 of a guide 25. The guide 25 is provided at its lower end with an annular flange 27 having a peripheral and downwardly depending skirt 28. The flange 27 provides a partition separating the whistle or resonating chamber 23 from the expansion chamber 22. An exhaust hole 30 is provided through the cap 16 and the upper end of the closed sleeve 26 for exhausting gas entrapped within the sleeve 26 when the plug 24 moves upward.

The plug 24 is provided at its lower end with a flange 31 having a circumferentially bevel 32 at its underedge cooperating with a peripheral margin of the pressure chamber 21 to define the gas escape area from the pressure chamber 21. The plug is also provided with a downwardly depending tapered spigot 33 at its lower end.

A resilient seal 34 is provided with the upper part of the hollow, mounting stub 14, the seal 34 being provided with an elongate aperture constituting an inlet passage 35 which provides intercommunication between the pressure chamber 21 and the pressure vessel exemplified by the humidifier assembly 11. At normal working pressures, when the plug 24 is in its low position with respect to the pressure chamber 21, the flange 31 is seated on the upper part of the seal 34, and the spigot 33 acts as a closure interfitting the upper portion of the inlet passage 35. It will be clear that the seal 34 is held in position by an annular shoulder 36 cooperating with an annular groove 37 provided in the resilient seal 34.

The upper margin of the inlet passage 35 is rounded so that as the tapered spigot 33 is withdrawn from the inlet passage 35 during the upward stroke of the plug 24, a gradually increasing annular escape area is provided for the gas passing into the pressure chamber 21.

Before the flange 31 of the plug 24 reaches the upper limit of the pressure chamber 21, the spigot 33 is effectively disengaged. When the flange 31 effectively clears the peripheral margin of pressure chamber 21, the escape area provided for the gas to pass into the expansion chamber 22 from the pressure chamber 21 is greater than the escape area provided into the pressure chamber 21 from the humidifier assembly 11. The escape of gas from the pressure chamber 21 into the expansion chamber 22 results in a drop of pressure in the pressure chamber 21 with a consequent return of the plug 24 which falls by gravity into the pressure chamber 21.

The cap 16 includes a sidewall 40 into which is cut a rectangular notch 41 as is illustrated in FIG. 5. The lower part of the cap 16 is recessed so as to form a lower rim 42 which interfits into a socket formed by an upper rim 43 provided by the sidewall of the base 17.

As shown in FIG. 2, the downwardly depending skirt 28 of the guide 25 provides an interior rim, the inner lower rim 42 of the cap 16 being sandwiched between the skirt 28 and the outer upper rim 43 provided by the base 17. The notch 41, upwardly extending from the lower margin of the cap 16, provides an open portion in the inner lower rim 42 of the cap 16, thereby constituting an outlet passage 44 leading to a whistle aperture 45 bounded by the upper portion of the notch 41 and the continuous portion of the outer upper rim 43 of the base 17.

The sidewall 40 of the cap 16 is provided with an annular V-shaped groove 46. The throat of the V-shaped groove 46 coincides substantially with the upper margin of the whistle aperture 45, thereby providing a whistle lip 47.

It is thought that the functional advantage of this audio relief valve has become fully apparent from the foregoing detailed description of the parts, but for completeness of disclosure, the operation of the relief valve will be briefly described.

The weight of the plug 24 which rides freely within the pressure chamber 21 is sufficient to withstand the normal working pressure exerted against the end of the spigot 33 closing the inlet passage 35. When this pressure becomes excessive, the plug 24 is urged upward and is kept in alignment by the sleeve 26. The upper, closed end of the sleeve 26 and the cap 16 with which it is in contact are perforated by hole 30, the hole 30 providing escape means for gas entrapped within the sleeve 26. The withdrawal of the spigot 33 from the inlet passage 35 during the upward movement of the plug 24 provides an annular escape area for the gas passing into the pressure chamber 21. When the plug 24 reaches the upward end of its stroke within the pressure chamber 21 and the plug 24 passes from the pressure chamber 21 an annular escape area from pressure chamber 21 is created. This annular escape area is greater than the escape area into the pressure chamber 21. The resultant fall in pressure within the pressure chamber 21 allows the plug 24 to fall back in place within the pressure chamber 21, and allows the spigot 33 to close, once again, the inlet passage 35.

The gas in the expansion chamber 22 passes to ambience by way of the outlet passage 44 and the whistle aperture 45, creating as it does so in cooperation with the whistle lip 47 and the whistle or resonating chamber 23, a resonating whistle of substantially constant pitch.

As long as the pressure within the humidifier assembly 11 remains excessive, gas will escape to the atmosphere in this way, the plug 24 undergoing reciprocative movement causing intermittent, constant pitch whistles. The frequency of the reciprocative movement of the plug 24, and hence of the whistles, is determined by the gas condition in the pressure vessel 11, and the whistles will be within the human audio range.

I claim as my invention:

1. An audio relief valve for a pressure vessel or the like comprising:
    (a) a body, the body including:
        (1) a first chamber, constituting an expansion chamber,
        (2) an outlet passage intercommunicating between the expansion chamber and ambience,
        (3) means within the outlet passage providing a whistle,
        (4) a second smaller chamber constituting a pressure chamber, and
        (5) an inlet passage for intercommunicating between the pressure chamber and the pressure valve, and
    (b) a valve means within the body slidable in the pressure chamber substantially to close one end of said chamber, the valve means opening and closing the inlet passage.

2. An audio relief valve as defined in claim 1, in which:
(c) the valve means includes a plug slidable in the pressure chamber, and
(d) the plug including a spigot at one end, the spigot seating in the inlet passage, outward movement of the plug causing withdrawal of the spigot from the inlet passage while the plug is still interfitted within the pressure chamber, and the gas escape area provided from the pressure chamber, as the plug is withdrawn from the pressure chamber, being larger than the gas escape area into the pressure chamber, and
(e) means guiding the plug.

3. An audio relief valve as defined in claim 1, in which:
(c) the body includes a third chamber, constituting a whistle chamber, interconnected with the outlet passage.

4. An audio relief valve as defined in claim 2, in which:
(f) the body includes a constant volume third chamber, constituting a whistle chamber, interconnected with the outlet passage, and
(g) the means guiding the plug include a sleeve slidably receiving the plug at one end of the sleeve, the other end of the sleeve including gas escape means.

5. An audio relief valve as defined in claim 1, in which:
(c) the body includes a cap and a base, each having a rim, one rim embraceably receiving the other rim,
(d) the inner rim includes a slot, and
(e) means within the body overlying the slot of the inner rim, the slot thereby forming the body outlet passage, and
(f) the cap including a whistle aperture partially defined by a lip and communicating with the slot.

6. An audio relief valve as defined in claim 2, in which:
(f) the body includes a constant volume third chamber constituting a whistle chamber, interconnected with the outlet passage,
(g) the means guiding the plug include a sleeve slidably receiving the plug at one end of the sleeve, the other end of the sleeve including gas escape means,
(h) a peripheral flange around the sleeve, the flange including a downwardly depending skirt, the flange providing partition means subdividing the body into the expansion chamber and the whistle chamber,
(i) the body including a cap and a base, each having a rim, one rim embraceably receiving the other rim,
(j) the inner rim includes a slot,
(k) the skirt of the peripheral flange overlies the slot of the inner rim, the slot thereby forming the body outlet passage, and
(l) the cap includes a whistle chamber communicating with the outlet passage and ambience.

7. An audio relief valve as defined in claim 6, in which:
(m) the plug is weight biased and is provided with an outwardly extending flange received in the pressure chamber, the flange including a peripheral bevel around its inwardly facing edge cooperating with a peripheral margin of the pressure chamber to define the gas escape area from the pressure chamber,
(n) the spigot is tapered,
(o) the base of the body is provided with a throat for intercommunicating between the body and the pressure vessel, the throat having its inner peripheral seal, the seal including a hole constituting the inlet passage intercommunicating between the pressure chamber and the pressure valve, the seal also providing a seat for the plug, and
(p) the cap includes a sidewall, incorporating the whistle aperture, and a peripheral groove around the cap which provides the cap with a pinched configuration, the groove reducing the thickness of the sidewall along the margin of the whistle aperture thereby forming a lip.

References Cited

UNITED STATES PATENTS

| | | | |
|---|---|---|---|
| 777,538 | 12/1904 | Puckett | 116—70 |
| 842,160 | 1/1907 | Aikman | 116—70 |
| 1,128,242 | 2/1915 | Gillis | 116—70 |
| 1,305,964 | 6/1919 | Dickson | 137—557 XR |
| 1,493,570 | 5/1924 | Slate | 116—70 |

HENRY T. KLINKSIEK, Primary Examiner

U.S. Cl. X.R.

116—70, 137; 137—469, 533